United States Patent
Alharbi et al.

(10) Patent No.: US 12,473,810 B2
(45) Date of Patent: Nov. 18, 2025

(54) METHOD AND SYSTEM USING MACHINE LEARNING FOR WELL OPERATIONS AND LOGISTICS

(71) Applicant: SAUDI ARABIAN OIL COMPANY, Dhahran (SA)

(72) Inventors: Moataz M. Alharbi, Udhailiyah (SA); Guadalupe Adrian Buenrostro Mendoza, Udhailiyah (SA); Hussain A. Saeed, Udhailiyah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 1031 days.

(21) Appl. No.: 17/364,135

(22) Filed: Jun. 30, 2021

(65) Prior Publication Data
US 2023/0003113 A1   Jan. 5, 2023

(51) Int. Cl.
*E21B 44/00*   (2006.01)
*G05B 13/02*   (2006.01)
*G06N 3/084*   (2023.01)

(52) U.S. Cl.
CPC ............ *E21B 44/00* (2013.01); *G05B 13/027* (2013.01); *G06N 3/084* (2013.01)

(58) Field of Classification Search
CPC .......... G06N 5/04; G06N 20/00; G06N 3/044; G06N 5/01; G06N 20/20; G06N 3/088;
(Continued)

(56) References Cited

U.S. PATENT DOCUMENTS

| | | |
|---|---|---|
| 7,395,252 B2 | 7/2008 | Anderson et al. |
| 8,504,335 B2 | 8/2013 | Furman et al. |
| (Continued) | | |

FOREIGN PATENT DOCUMENTS

| | | |
|---|---|---|
| CN | 109784539 A | 5/2019 |
| WO | 2017/059152 A1 | 4/2017 |
| WO | 2020/191360 A1 | 9/2020 |

OTHER PUBLICATIONS

Hardy, A. M. (2014). Completion Design and Execution Strategy for Increasing Maui Reserve. (Year: 2014).*
(Continued)

*Primary Examiner* — Kevin W Figueroa
(74) *Attorney, Agent, or Firm* — Osha Bergman Watanabe & Burton LLP

(57) ABSTRACT

A method may include generating a first well intervention plan for a well site automatically based on a predetermined scheduling criterion. The first well intervention plan is generated using a first set of data inputs regarding one or more well intervention providers and one or more well conditions. The method may further include obtaining first well data regarding the well site. The method may further include adjusting the predetermined scheduling criterion to produce an adjusted scheduling criterion using the first well data. The adjusted scheduling criterion corresponds to a second set of data inputs that are different from the first set of data inputs. The method may further include generating a second well intervention plan for the well site based on the adjusted scheduling criterion. The method may further include transmitting a command to the well site that adjusts well operations based on the second well intervention plan.

14 Claims, 10 Drawing Sheets

(58) Field of Classification Search
CPC ..... G06N 3/0985; H04L 43/08; H04L 41/147; H04L 41/16
See application file for complete search history.

(56) References Cited

U.S. PATENT DOCUMENTS

| | | | |
|---|---|---|---|
| 10,605,054 | B2 | 3/2020 | Klenner et al. |
| 10,613,488 | B2 | 4/2020 | Iyer et al. |
| 10,726,263 | B1 | 7/2020 | Adler |
| 10,851,636 | B1 | 12/2020 | Basu et al. |
| 11,790,320 | B2 * | 10/2023 | Chen .................. G06Q 10/103 705/7.23 |
| 2008/0275594 | A1 | 11/2008 | de Guzman |
| 2009/0211761 | A1 * | 8/2009 | Broussard .......... E21B 33/0422 166/368 |
| 2014/0058775 | A1 | 2/2014 | Siig et al. |
| 2014/0310049 | A1 | 10/2014 | Goel et al. |
| 2015/0029034 | A1 | 1/2015 | Abbassian et al. |
| 2015/0294258 | A1 * | 10/2015 | Hildebrand ............ E21B 45/00 705/7.15 |
| 2015/0315869 | A1 * | 11/2015 | Landry .................. E21B 34/02 166/97.1 |
| 2018/0106134 | A1 * | 4/2018 | Meehan ................ E21B 44/00 |
| 2019/0242219 | A1 * | 8/2019 | Valleru ................. E21B 44/00 |
| 2019/0292908 | A1 | 9/2019 | Karimi Vajargah et al. |
| 2020/0042915 | A1 | 2/2020 | Samson |
| 2020/0175441 | A1 | 6/2020 | Sukhobokov |
| 2020/0201267 | A1 | 6/2020 | Watson |
| 2020/0277848 | A1 * | 9/2020 | Johnston ............... E21B 44/00 |
| 2020/0327481 | A1 * | 10/2020 | Allouche ............... E21B 41/00 |
| 2020/0332627 | A1 | 10/2020 | Tang et al. |
| 2021/0017838 | A1 | 1/2021 | Meehan et al. |

OTHER PUBLICATIONS

Rogers, David, "Harnessing the Power of Artificial Intelligence (AI) and Machine Learning (ML) To Transform Logistics"; Insync Supply Chain Management Pty Ltd; Feb. 22, 2019; <https://www.iscm.com.au/2019/02/22/harnessing-the-power-of-artificial-intelligence-ai-and-machine-learning-ml-to-transform-logistics/>; Accessed Jan. 10, 2021 (4 pages).

Bughin, Jacques et al., "Artificial Intelligence: the Next Digital Frontier?"; Mckinsey Global Institute; Jun. 2017; <https://www.mckinsey.com/~/media/mckinsey/industries/advanced%20electronics/our%20insights/how%20artificial%20intelligence%20can%20deliver%20real%20value%20to%20companies/mgi-artificial-intelligence-discussion-paper.ashx>; Accessed Jan. 17, 2021 (80 pages).

Forbes insights, "Logistics, Supply Chain and Transportation 2023: Change at Breakneck Speed"; 2018; Accessed Jan. 17, 2021 (16 pages).

Makadia, Mitul, "7 Ways Machine Learning can Solve Supply Chain Challenges"; CustomerThink; Oct. 25, 2020; <https://customerthink.com/7-ways-machine-learning-can-solve-supply-chain-challenges/>; Accessed Jan. 10, 2021 (6 pages).

International Search Report and Written Opinion issued in corresponding International Patent Application No. PCT/US2022/035811, mailed on Sep. 28, 2022 (12 pages).

* cited by examiner

METHOD AND SYSTEM USING MACHINE LEARNING FOR WELL OPERATIONS AND LOGISTICS

BACKGROUND

Various operations are performed at a well site during the lifetime of a producing well. Such operations may include maintenance operations, surveillance, well tie-in as well as enhancement operations to increase hydrocarbon recovery. However, delays in a sub-task for a given operation may result in a domino effect that delays the rest of the operation and can delay availing the planned hydrocarbon production targets. Thus, accurate logistic evaluations may enable efficient planning of well operations for multiple wells.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes generating, by a well intervention manager, a first well intervention plan for a well site automatically based on a predetermined scheduling criterion. The first well intervention plan is generated using first set of data inputs regarding one or more well intervention providers and one or more well conditions. The method further includes obtaining, by the well intervention manager, first well data regarding the well site. The method further includes adjusting, automatically by the well intervention manager and using the first well data, the predetermined scheduling criterion to produce an adjusted scheduling criterion using the first well data. The adjusted scheduling criterion corresponds to a second set of data inputs that are different from the first set of data inputs. The method further includes generating, automatically by the well intervention manager and based on the adjusted scheduling criterion, a second well intervention plan for the well site. The method further includes transmitting, by the well intervention manager and using the first well data, a command to the well site that adjusts one or more well operations based on the second well intervention plan.

In general, in one aspect, embodiments relate to a system that includes various servers and a well site. The system further includes a well intervention manager including a computer processor. The well intervention manager is coupled to the servers and the well site. The well intervention manager generates a first well intervention plan for a well site automatically based on a predetermined scheduling criterion. The first well intervention plan is generated using a first set of data inputs regarding one or more well intervention providers and one or more well conditions. The well intervention manager obtains first well data regarding the well site. The well intervention manager adjusts the predetermined scheduling criterion to produce an adjusted scheduling criterion automatically using the first well data. The adjusted scheduling criterion corresponds to a second set of data inputs that are different from the first set of data inputs. The well intervention manager generates a second well intervention plan for the well site automatically based on the adjusted scheduling criterion. The well intervention manager transmits a command to the well site that adjusts one or more well operations based on the second well intervention plan.

In general, in one aspect, embodiments relate to a non-transitory computer readable medium storing instructions executable by a computer processor. The instructions include generating a first well intervention plan for a well site automatically based on a predetermined scheduling criterion. The first well intervention plan is generated using a first set of data inputs regarding one or more well intervention providers and one or more well conditions. The instructions further include obtaining first well data regarding the well site. The instructions further include adjusting the predetermined scheduling criterion to produce an adjusted scheduling criterion automatically using the first well data. The adjusted scheduling criterion corresponds to a second set of data inputs that are different from the first set of data inputs. The instructions further include generating a second well intervention plan for the well site automatically based on the adjusted scheduling criterion. The instructions further include transmitting a command to the well site that adjusts one or more well operations based on the second well intervention plan.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
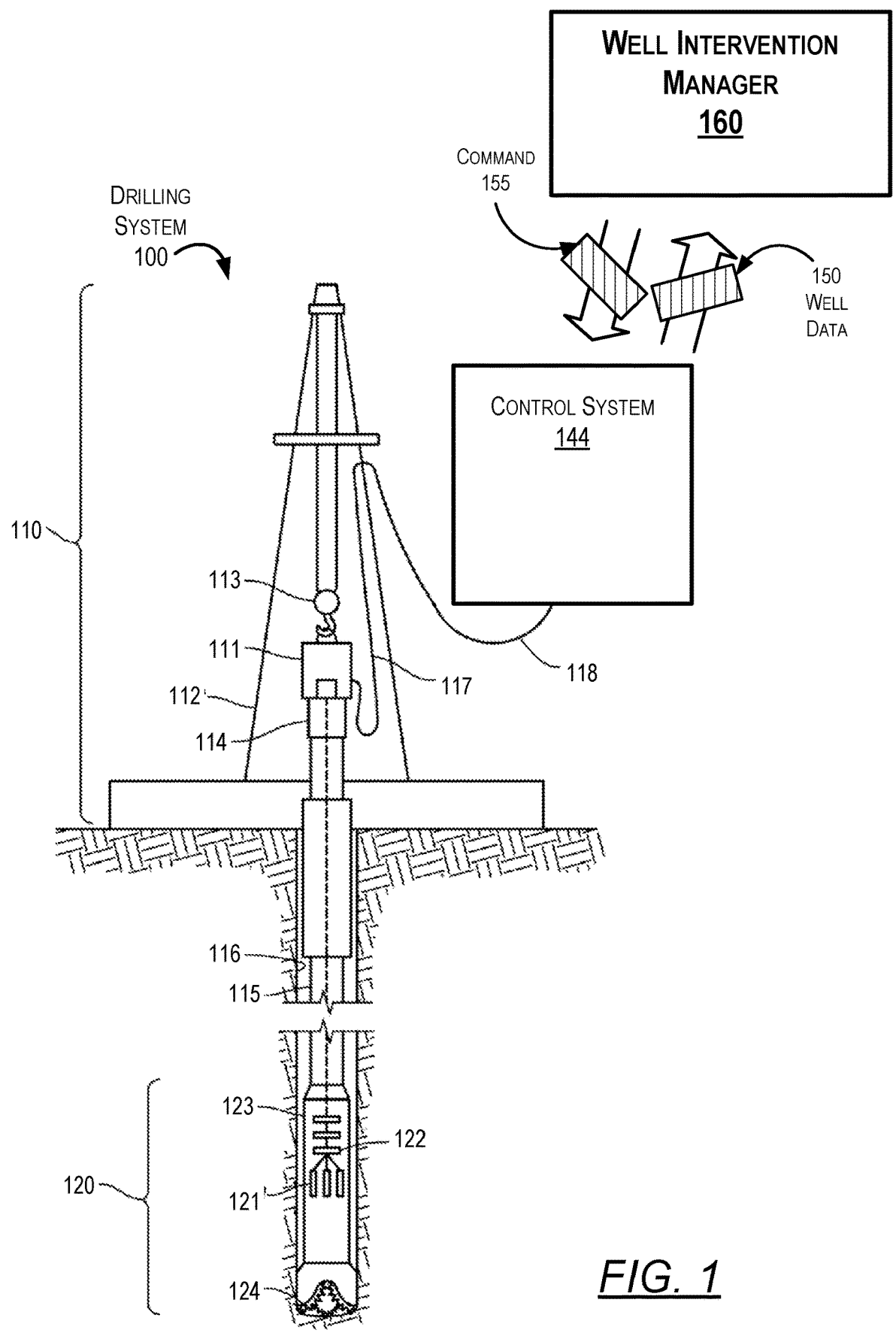
FIGS. 1 and 2 show systems in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for determining a well intervention plan using machine learning (ML). In some embodiments, for example, a well intervention operation may include various logistical considerations based on issues such as service providers and material availability, nearby activities in surrounding wells, tool availability, weather conditions, safety concerns, etc., as well as various service provider considerations (e.g., local contract conditions, the scope of the sub-tasks within the contracts, operational aspects, involved parties, interdepartmental interactions, etc.). As such, human site planning may be a tedious process that is difficult to re-schedule based on changing well scenarios. Likewise, human planners may miss important scheduling criteria for avoiding conflicts and human errors. Accordingly, some embodiments include a well intervention manager that may be a "smart system" or "expert system" that automatically plans, synchronizes, and/or readjusts scheduling criteria for a well intervention plan for one or more well intervention operations. In other words, a well intervention manager may be an artificial intelligence entity operation on a well management network (e.g., as a network controller) that performs such functionality.

Moreover, some embodiments include a well intervention manager with self-decision functionality that operates independently and with flexibility. For example, the well intervention manager may perform a learning process that detects unusual items not involved for planning purposes. For example, a well intervention manager may determine statistical trends based on well data (such as maintenance and service log data), resource data, and/or service provider data. Likewise, a well intervention manager may determine one or more additional values or weights for arranging the setup of well sites schedules. This flexibility may accommodate changes in real time and on the fly observed matters, like safety concerns, alternate logistics interactions (other service entities and scheduling criteria, like government factors, weather factors, safety factors, legal factors, etc.) which builds trends and improve robustness of various well intervention plans by advising about possible issues. These different factors may provide the data inputs that are adjusted over time to optimize a particular scheduling criterion.

Furthermore, some embodiments use one or more machine learning algorithms to determine which data inputs to use for a scheduling criterion. For example, different sets of data inputs may maximize operational efficiency and hydrocarbon production at one or more wells, while also minimizing operational costs for those same wells. For example, an optimized set of data inputs may be a subset of larger aggregated set of data inputs identified over a well management network. These aggregated data inputs may be recognized by a well intervention manager, where the well intervention manager proscribes different weights or significances to various data inputs. Thus, a well intervention manager may provide a flexible method to accommodate multiple scheduling criteria (e.g., swapping importance/relevance of different data inputs that corresponds to various incidents, costs, contracts, performances, etc.) in real-time to re-arrange different well intervention plans. Thus, a well intervention manager may automatically readjust variables for a well intervention plan based on predicting their future importance to a user. In some embodiments, a well intervention plan may be updated based on real-time observed matters during actual performance of the well intervention plan (e.g., in response to changing safety concerns, alternate logistics interaction, contract terms, conditions, scope, cost and resources related to implementation of the plan, etc.).

Turning to FIG. 1, FIG. 1 shows a drilling system (100) that may include a top drive drill rig (110) arranged around the setup of a drill bit logging tool (120). A top drive drill rig (110) may include a top drive (111) that may be suspended in a derrick (112) by a travelling block (113). In the center of the top drive (111), a drive shaft (114) may be coupled to a top pipe of a drill string (115), for example, by threads. The top drive (111) may rotate the drive shaft (114), so that the drill string (115) and a drill bit logging tool (120) cut the rock at the bottom of a wellbore (116). A power cable (117) supplying electric power to the top drive (111) may be protected inside one or more service loops (118) coupled to a control system (144). As such, drilling mud may be pumped into the wellbore (116) through a mud line, the drive shaft (114), and/or the drill string (115).

The control system (144) may include one or more programmable logic controllers (PLCs) that include hardware and/or software with functionality to control one or more processes performed by the drilling system (100). Specifically, a programmable logic controller may control valve states, fluid levels, pipe pressures, warning alarms, and/or pressure releases throughout a drilling rig. In particular, a programmable logic controller may be a ruggedized computer system with functionality to withstand vibrations, extreme temperatures, wet conditions, and/or dusty conditions, for example, around a drilling rig. Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress. For example, the control system (144) may be coupled to the sensor assembly (123) in order to perform various program functions for up-down steering and left-right steering of the drill bit (124) through the wellbore (116). While one control system is shown in FIG. 1, the drilling system (100) may include multiple control systems for managing various well drilling operations, maintenance operations, well completion operations, and/or well intervention operations.

The wellbore (116) may include a bored hole that extends from the surface into a target zone of the hydrocarbon-bearing formation, such as the reservoir. An upper end of the wellbore (116), terminating at or near the surface, may be referred to as the "up-hole" end of the wellbore (116), and a lower end of the wellbore, terminating in the hydrocarbon-bearing formation, may be referred to as the "down-hole" end of the wellbore (116). The wellbore (116) may facilitate the circulation of drilling fluids during well drilling operations, the flow of hydrocarbon production ("production") (e.g., oil and gas) from the reservoir to the surface during production operations, the injection of substances (e.g., water) into the hydrocarbon-bearing formation or the reservoir during injection operations, or the communication of monitoring devices (e.g., logging tools) into the hydrocarbon-bearing formation or the reservoir during monitoring operations (e.g., during in situ logging operations).

As further shown in FIG. 1, sensors (121) may be included in a sensor assembly (123), which is positioned adjacent to a drill bit (124) and coupled to the drill string (115). Sensors (121) may also be coupled to a processor assembly (123) that includes a processor, memory, and an analog-to-digital converter (122) for processing sensor measurements. For example, the sensors (121) may include acoustic sensors, such as accelerometers, measurement microphones, contact microphones, and hydrophones. Likewise, the sensors (121) may include other types of sensors, such as transmitters and receivers to measure resistivity, gamma ray detectors, etc. The sensors (121) may include hardware and/or software for generating different types of well logs (such as acoustic logs or sonic longs) that may provide well data about a wellbore, including porosity of wellbore sections, gas saturation, bed boundaries in a geologic formation, fractures in the wellbore or completion cement, and many other pieces of information about a formation. If such well data is acquired during well drilling operations (i.e., logging-while-drilling), then the information may be used to make adjustments to drilling operations in real-time. Such adjustments may include rate of penetration (ROP), drilling direction, altering mud weight, and many others drilling parameters.

In some embodiments, acoustic sensors may be installed in a drilling fluid circulation system of a drilling system (100) to record acoustic drilling signals in real-time. Drilling acoustic signals may transmit through the drilling fluid to be recorded by the acoustic sensors located in the drilling fluid circulation system. The recorded drilling acoustic signals may be processed and analyzed to determine well data, such as lithological and petrophysical properties of the rock formation. This well data may be used in various applications, such as steering a drill bit using geosteering, casing shoe positioning, etc.

Keeping with FIG. 1, when completing a well, one or more well completion operations may be performed prior to delivering the well to the party responsible for production or injection. Well completion operations may include casing operations, cementing operations, perforating the well, gravel packing, directional drilling, hydraulic and acid stimulation of a reservoir region, and/or installing a production tree or wellhead assembly at the wellbore (116). Likewise, well operations may include open-hole completions or cased-hole completions. For example, an open-hole completion may refer to a well that is drilled to the top of the hydrocarbon reservoir. Thus, the well is cased at the top of the reservoir, and left open at the bottom of a wellbore. In contrast, cased-hole completions may include running casing into a reservoir region. Cased-hole completions are discussed further below with respect to perforation operations.

In one well delivery example, the sides of the wellbore (116) may require support, and thus casing may be inserted into the wellbore (116) to provide such support. After a well has been drilled, casing may ensure that the wellbore (116) does not close in upon itself, while also protecting the wellstream from outside incumbents, like water or sand. Likewise, if the formation is firm, casing may include a solid string of steel pipe that is run on the well and will remain that way during the life of the well. In some embodiments, the casing includes a wire screen liner that blocks loose sand from entering the wellbore (116).

In another well delivery example, a space between the casing and the untreated sides of the wellbore (116) may be cemented to hold a casing in place. This well operation may include pumping cement slurry into the wellbore (116) to displace existing drilling fluid and fill in this space between the casing and the untreated sides of the wellbore (116). Cement slurry may include a mixture of various additives and cement. After the cement slurry is left to harden, cement may seal the wellbore (116) from non-hydrocarbons that attempt to enter the wellstream. In some embodiments, the cement slurry is forced through a lower end of the casing and into an annulus between the casing and a wall of the wellbore (116). More specifically, a cementing plug may be used for pushing the cement slurry from the casing. For example, the cementing plug may be a rubber plug used to separate cement slurry from other fluids, reducing contamination and maintaining predictable slurry performance. A displacement fluid, such as water, or an appropriately weighted drilling fluid, may be pumped into the casing above the cementing plug. This displacement fluid may be pressurized fluid that serves to urge the cementing plug downward through the casing to extrude the cement from the casing outlet and back up into the annulus.

Keeping with well operations, some embodiments include perforation operations. More specifically, a perforation operation may include perforating casing and cement at different locations in the wellbore (116) to enable hydrocarbons to enter a wellstream from the resulting holes. For example, some perforation operations include using a perforation gun at different reservoir levels to produce holed sections through the casing, cement, and sides of the wellbore (116). Hydrocarbons may then enter the wellstream through these holed sections. In some embodiments, perforation operations are performed using discharging jets or shaped explosive charges to penetrate the casing around the wellbore (116).

In another well delivery, a filtration system may be installed in the wellbore (116) in order to prevent sand and other debris from entering the wellstream. For example, a gravel packing operation may be performed using a gravel-packing slurry of appropriately sized pieces of coarse sand or gravel. As such, the gravel-packing slurry may be pumped into the wellbore (116) between a casing's slotted liner and the sides of the wellbore (116). The slotted liner and the gravel pack may filter sand and other debris that might have otherwise entered the wellstream with hydrocarbons.

In another well delivery, a wellhead assembly may be installed on the wellhead of the wellbore (116). A wellhead assembly may be a production tree (also called a Christmas tree) that includes valves, gauges, and other components to provide surface control of subsurface conditions of a well.

In some embodiments, a well intervention manager (160) is coupled to one or more control systems (e.g., control system (144)) at a wellsite. For example, a well intervention manager (160) may include hardware and/or software to collect well operation data (e.g., well operation data (150)) from one or more well sites. Likewise, the well intervention manager (160) may monitor various well operations performed by various service entities. In some embodiments, a well intervention manager (160) is a controller located on a server remote from the well site. In some embodiments, a well intervention manager (160) may be similar to a control system coupled to the drilling system (100). In some embodiments, the well intervention manager (160) may include a computer system that is similar to the computer system (602) described below with regard to FIG. 6 and the accompanying description.

In some embodiments, well intervention operations may include various operations carried out by one or more service entities for an oil or gas well during its productive life (e.g., fracking operations, CT, flow back, separator, pumping, wellhead and Christmas tree maintenance, slickline, wireline, well maintenance, stimulation, braded line, coiled tubing, snubbing, workover, subsea well intervention, etc.). For example, well intervention activities may be similar to well completion operations, well delivery operations, and/or drilling operations in order to modify the state of a well or well geometry. In some embodiments, well intervention operations provide well diagnostics, and/or manage the production of the well. With respect to service entities, a service entity may be a company or other actor that performs one or more types of oil field services, such as well operations, at a well site. For example, one or more service entities may be responsible for performing a cementing operation in the wellbore (116) prior to delivering the well to a producing entity.

Moreover, a well intervention manager (160) may include functionality for coordinating various oilfield services, such as well intervention using various commands (e.g., command (155)), e.g., by transmitting commands to various network devices (e.g., control system (144)) in a drilling system as well as various user devices at the well site. In some embodiments, for example, a command is a network message that automatically assigns or reassigns tasks or operations to various service entities at a well site. For example, a well intervention manager (160) may communicate with one or more service entities through various user devices, e.g., by receiving periodic status reports, sending messages through user interfaces, etc. Likewise, the well intervention manager (160) may also collect other well operation data, such as sensor data from the drilling system (100), service provider data, resource data (including rig and rigless site daily reports), feedback through a human machine interface from other personnel at the well site, and/or data from a historian operating at the well site. The well intervention manager (160) may be a computer system similar to computer system (602) described below in FIG. 6 and the accompanying description.

In some embodiments, a well intervention manager (160) includes one or more ML models (e.g., ML models X (265)) for determining a well intervention plan using data inputs. For example, a scheduling criterion may correspond to a specific set of data inputs that may be adjusted (e.g., data inputs added and/or removed) to modify the well intervention plan. For example, artificial intelligence (AI) techniques may assist a well intervention manager in linking contributions of different service entities to a well delivery process (i.e., a well delivery process that includes one or more well operations) to evaluate efficiency and service quality. In some embodiments, for example, a well intervention manager (160) uses a ML model (265) to determine a well intervention plan for measuring a service entity's contribution to a particular well intervention. For more information regarding well intervention planning, see FIGS. 2 and 4 below and the accompanying description.

Figure 2:
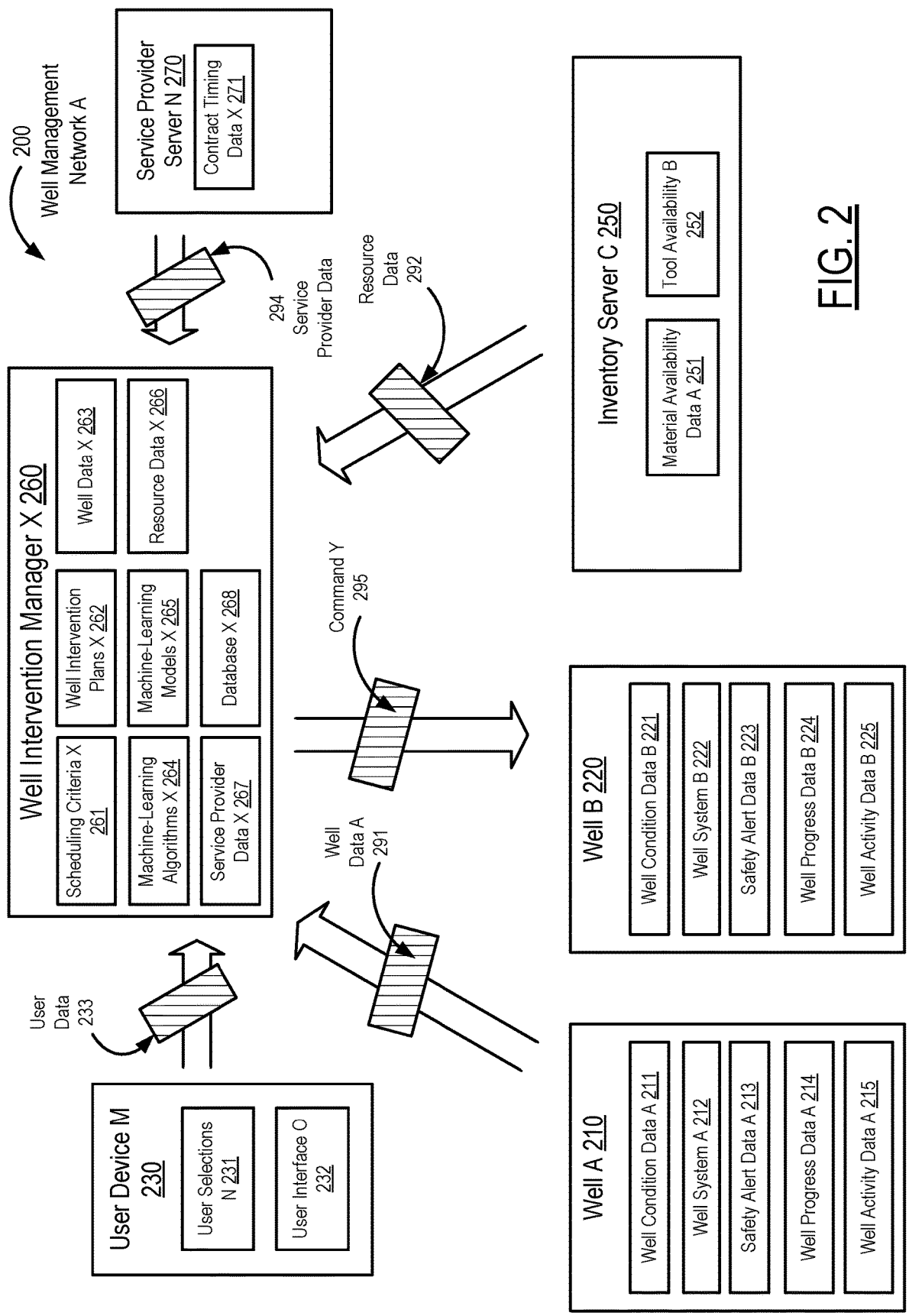

Turning to FIG. 2, FIG. 2 shows a schematic diagram in accordance with one or more embodiments. As shown in FIG. 2, a well management network (e.g., well management network A (200)) may include a well intervention manager (e.g., well intervention manager X (260)), various oil and gas wells (e.g., well A (210), well B (220)), various servers (e.g., service provider server N (270)), and various user devices (e.g., user device M (230)), various inventory servers (e.g., inventory server C (250)), and/or various network elements (not shown). A well (e.g., well A (210), well B (220)) may include a well system (e.g., well system A (212), well system B (222)) that is similar to well system (100) described above in FIG. 1 and the accompanying description. In some embodiments, various types of well data (e.g., well data A (291)) are collected over the well management network, such as well condition data (e.g., well condition data A (211)), safety alert data (e.g., safety alert data A (213)), well progress data (e.g., well progress data A (214)), and/or well activity data (e.g., well activity data A (215)). Likewise, the well management network may also collect data regarding other well activities data (e.g., user data (233), resource data (292), service provider data (294)) from one or more user device and/or data servers (e.g., user device M (230), inventory server C (250), well service provider servicer N (270)). For example, safety data may be associated with safety alerts. Well condition data may describe various conditions at one or more wells, such as corresponding to safety conditions, weather conditions, well conditions, etc. Resource data may include information describing material availability, tools availability. Service provider data may include logistical data regarding different service providers, such as information regarding contract timing expiration, service provider availability, etc.

In some embodiments, an inventory server may be a remote server that includes hardware and/or software with functionality for managing and/or tracking equipment. For example, an inventory server may maintain resource data on drilling tools and various well intervention tools based on the location of a respective tool for a particular time period. Likewise, a remote server may be a server that communicates to various well sites over the Internet or through a cloud computing environment. When tools are committed to various well operations, the current or future operation with the respective tool may be logged automatically with the inventory server (e.g., by detecting a scan of the tool's unique identifier). Accordingly, an inventory server may transmit resource data (e.g., updates to changes in a respective tool's availability for a particular well site) to a well intervention manager.

In some embodiments, a service provider server is a remote server that includes hardware and/or software for managing and tracking service provider data. For example, the service provider server may obtain contract data regarding various service entities and their commitments to current and/or future well operation contracts. Accordingly, a service provider server may transmit service provider data (e.g., updates to changes in possible service entity conflicts for a given well operation) to a well intervention manager.

In some embodiments, the well intervention manager (e.g., well intervention manager X (260)) may include hardware and/or software that obtain a scheduling criterion (e.g., scheduling criteria X (261)) regarding well intervention activities, well data (e.g., well data X (263)), resource data (e.g., resource data X (266)), and/or service provider data (e.g., service provider data X (267)) from data inputs (e.g., user data (233), well data A (291), resource data (292), service provider data (294)). For example, the well intervention manager (e.g., well intervention manager X (260)) acquires the scheduling criterion (e.g., scheduling criteria X (261)) from a user data (233) collected by a user device (e.g., user device M (230)). The user device (e.g., user device M (230)) may include hardware and/or software to receive real-time user selections (e.g., user selections N (231)) by interacting with a user via a user interface (e.g., user interface O (232)). Specifically, the well intervention manager (e.g., well intervention manager X (260)) allows the user to interact with the user device (e.g., user device M (230)) to verify the actual well intervention plan setup is as per desire and monitor the performance as the self-learning process of the ML algorithm is set up for retro alimentation up on the actual events. When the well intervention plan setup is not desired, the user can modify the user selections (e.g., user selections N (231)) to adjust the scheduling criterion via the graphical display (e.g., user interface O (232)).

Keeping with FIG. 2, in some embodiments, the well intervention manager (e.g., well intervention manager X (260)) may include hardware and/or software to generate one or more well intervention plans within the well management network (e.g., well management network A (200)) using one or more ML algorithms (e.g., ML algorithms X (264)) based on the obtained scheduling criterion and well intervention activities. For example, a well intervention manager may implement machine learning by gathering data from actual well progress data (e.g., status updates at a well site regarding one or more well operations) and real events to tune a particular scheduling criterion and/or logical margins regarding flexibility for a well site's year, monthly, weekly plans. Thus, different inputs (e.g., types of data or different data sources) may provide the initial setup of a particular scheduling criterion, where the data inputs may be customized according to different well scenarios to better arrange a forward schedule as a well intervention plan. Since the well intervention manager is self-maintained on data storage and usage for retro alimentation, the well intervention manager may require minimal supervision of human interaction. In some embodiments, the well intervention manager advises a user about a plan's regular structure of setting a well intervention plan when the learning process detects possible related concerns that a human might miss due to the amount of variables and possible related issues. For example, an advisement may be a message prompt in a graphical user interface managed by the well intervention manager.

In some embodiments, for example, the well intervention manager (e.g., well intervention manager X (260)) applies one or more ML algorithms (e.g., an unsupervised ML algorithm, a reinforcement ML algorithm, a self-supervised ML algorithm, etc.) to train a model (e.g., ML models X (265)). Specifically, the well intervention manager (e.g., well intervention manager X (260)) applies the model to generate a well intervention plan at a well site using data inputs regarding one or more well intervention providers and one or more well conditions.

With respect to ML models, different types of ML models may be used, such as convolutional neural networks, deep neural networks, recurrent neural networks, support vector machines, decision trees, inductive learning models, deductive learning models, unsupervised learning models, supervised learning models, reinforcement learning models, self-supervised learning models, etc. In some embodiments, a well intervention manager may generate augmented or synthetic data to produce a large amount of interpreted data for training a particular model. Likewise, a ML model may be trained using one or more ML algorithms. For example, a backpropagation algorithm may be used to train a neural network. The training data may include the predetermined scheduling criterion and data inputs from historical events regarding one or more well intervention providers and one or more well conditions. A well intervention manager may continue to train the ML model by self-feeding database (e.g., database X (268)) for historical learning process. Thus, the ML model predicts the well intervention plan for performance as the self-learning process of the algorithm is setup for retro alimentation upon the actual events as per desire.

With respect to neural networks, for example, a neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled. Through machine learning, a neural network may determine which data inputs should receive greater priority in determining one or more specified outputs of the neural network. Likewise, these weighted data inputs may be summed such that this sum is communicated through a neuron's activation function to other hidden layers within the neural network. As such, the activation function may determine whether and to what extent an output of a neuron progresses to other neurons where the output may be weighted again for use as an input to the next hidden layer.

In some embodiments, the well intervention manager may perform one or more ML algorithms (e.g., an unsupervised ML algorithm, a reinforcement ML algorithm, a self-supervised ML algorithm, etc.) based on an obtained scheduling criterion and data inputs. In particular, a reinforcement learning algorithm may be a type of method that autonomously learns agent policies through multiple iterations of trials and evaluations based on data inputs. The objective of a reinforcement learning algorithm may be to learn an agent policy $\pi$ that maps the state of a well intervention activity to a well intervention plan so as to maximize an expected reward $J(\pi)$. A value reward may describe one or more qualities of data inputs for a particular well within an operation, such as a frac operation. For another example, a reinforcement learning algorithm may include an action selector engine to determine commands and/or pump actions based on policy data and one or more reward functions. More specifically, a reinforcement learning algorithm may train a policy to make a sequence of decisions based on the observed states of the environment to maximize the cumulative reward determined by a reward function. For example, a reinforcement learning algorithm may employ a trial-and-error procedure to determine one or more agent policies based on various agents interaction with a complex environment. As such, a reinforcement learning algorithm may include a reward function that teaches a particular action selection engine to follow certain rules, while still allowing the reinforcement learning model to retain information learned from data inputs regarding one or more well intervention providers and one or more well conditions.

In some embodiments, the well intervention manager may perform a self-supervised ML algorithm to train a model based on an obtained scheduling criterion and data inputs. In particular, a self-supervised learning is a subclass of unsupervised machine learning which requires only unlabeled data to provide the supervision and formulate a pretext learning task such as predicting context or image rotation for some part of the data. The objective of a self-supervised learning algorithm may force the neural network (e.g., a convolutional neural network) to learn a high-level semantic representation to solve the task of interest. For example, a self-supervised learning algorithm may calculate the similarity with semantic information of well intervention activity preference that is implicitly present within the well management network based on the scheduling criterion. The self-supervised learning algorithm may then calculate the similarity between the list of well intervention activities based on one or more qualities of data inputs.

In some embodiments, a well intervention manager is used to generate a well intervention plan within a well management network for planning, synchronizing and optimizing the logistics a well intervention plan using one or more ML algorithms (e.g., an unsupervised ML algorithm, a reinforcement ML algorithm, a self-supervised ML algorithm) to maximize operational efficiency, availing hydrocarbon and minimizing budget expenditure. In some embodiments, a first well intervention plan may be generated by the well intervention manager based on a predetermined scheduling criterion determined by a user based on real-time observed matters (e.g., safety concerns, contract terms, conditions, scope, cost, resources, weather, government, legal, etc.). The well intervention manager may apply one or more ML algorithms to adjust the predetermined scheduling criterion based on new data. The well intervention manager may apply one or more ML algorithms to accommodate the adjusted scheduling criterion within seconds and re-arrange different operations. The well intervention manager automatically re-schedules the well intervention plan for emerging issues based on an adjusted scheduling criterion. In doing so, the well intervention may eliminate new conflicts and human errors.

Furthermore, the well intervention manager may apply one or more ML algorithms to generate multiple well intervention plans for different well scenarios for a well site of interest based on an adjusted scheduling criterion by using real-time well data. Accordingly, a well intervention manager may have the capability to adapt to different logistics conditions and schemes. In some embodiments, the adjusted well intervention plan is outputted for display for a user via a graphical user interface for a user to observe appearances, conflicts, and awareness of possible issues with the plan. For example, the well intervention manager may automatically self-feed and build a database for a historical learning process that clearly enumerates changes to a well intervention plan based on newly acquired data and statistical trends.

In some embodiments, the well intervention manager may perform an unsupervised ML algorithm to train a model based on an obtained scheduling criterion and data inputs. In particular, unsupervised learning requires only unlabeled data to build a compact internal representation to formulate a pattern learning task for the data inputs. The objective of an unsupervised learning algorithm may force the neural network to learn the compact internal representation (e.g., natural clusters) of data inputs based on multiple attributes to solve the task of interest. For example, an unsupervised learning algorithm builds a well intervention plan and classifies the pattern of well intervention activities based on an obtained scheduling criterion. These natural clusters are given various priorities to solve the task. For example, a natural cluster "1" is given a "high" priority when the well intervention activity is urgent and all the required tools and materials are available. For another example, a natural cluster "5" is given a "low" priority when the well intervention activity is not urgent and all the required tools and materials are unavailable. The unsupervised learning algorithm then classifies the list of well intervention activities by using multiple natural clusters for the compact internal representation based on one or more qualities of data inputs (e.g., scheduling criteria X (261), well data X (263), inventory availability data (268), and/or service provider data (266)) for a particular well (e.g., well B (220)) and convergence items for recommendation based on the analysis of the pattern of natural clusters that characterize the list of well intervention activities. The top N natural clusters have the highest priorities are recommended as the new convergence items for the particular well.

While FIGS. 1 and 2 shows various configurations of components, other configurations may be used without departing from the scope of the disclosure. For example, various components in FIGS. 1 and 2 may be combined to create a single component. As another example, the functionality performed by a single component may be performed by two or more components.

Figure 3:
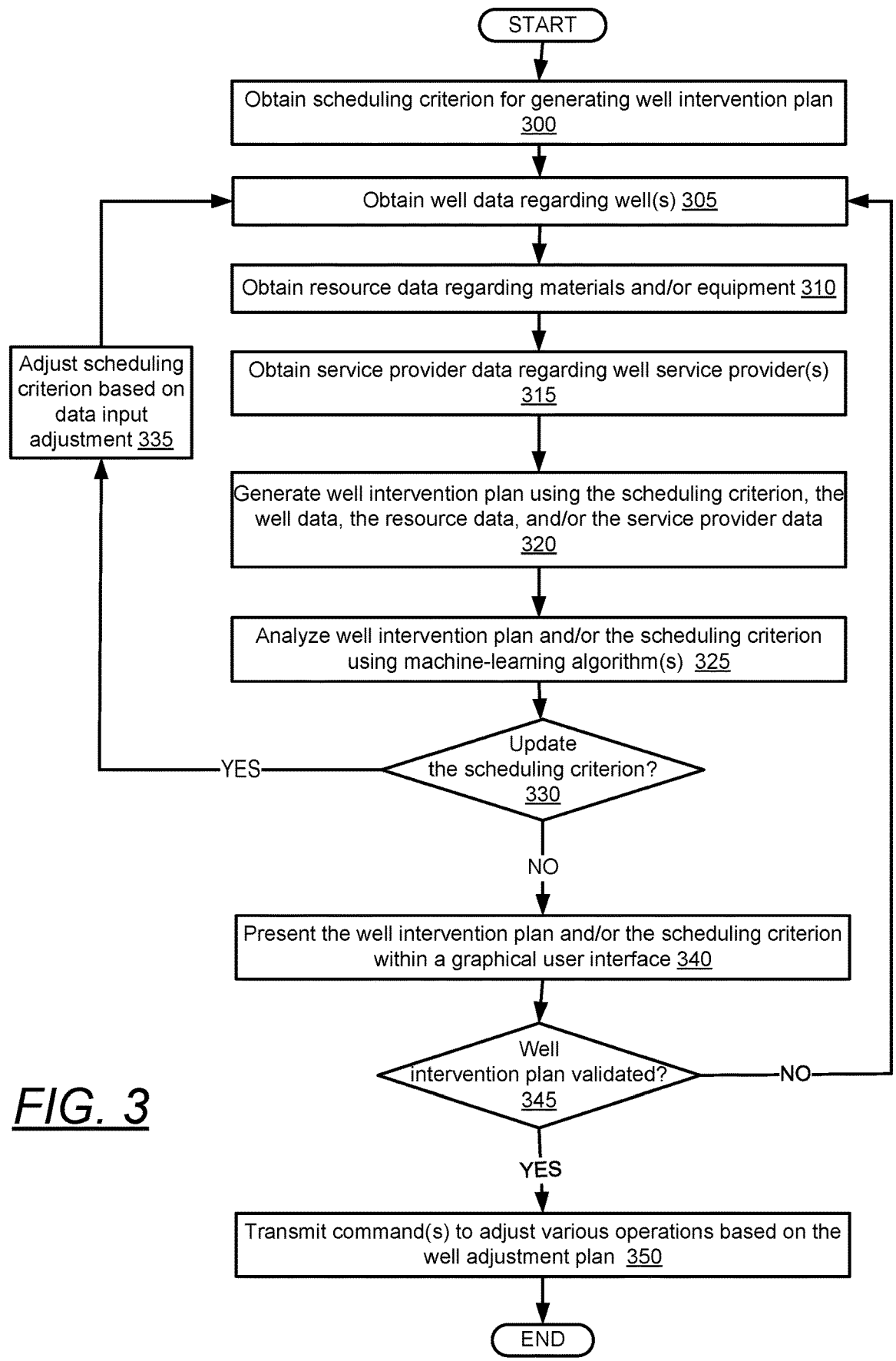
FIG. 3 shows a flowchart in accordance with one or more embodiments.

Turning to FIG. 3, FIG. 3 shows a flowchart in accordance with one or more embodiments. Specifically, FIG. 3 describes a general method for determining and/or validating a well intervention plan in accordance with one or more embodiments. One or more blocks in FIG. 3 may be performed by one or more components (e.g., well intervention manager X (260)) as described in FIGS. 1 and 2. While the various blocks in FIG. 3 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 300, a scheduling criterion is obtained for generating a well intervention plan in accordance with one or more embodiments. For example, a well intervention manager may obtain a scheduling criterion from a database that is associated with a particular well intervention plan.

In Block 305, well data is obtained for one or more wells in accordance with one or more embodiments. For example, the well data may be similar to the well data described above in FIGS. 1 and 2 and the accompanying description.

In Block 310, resource data is obtained regarding materials and/or equipment in accordance with one or more embodiments. In some embodiments, the resource data includes material availability data and tool availability data which determine the availability of materials and tools that are required to perform various well intervention activities. For example, resource data may be similar to the resource data described above in FIG. 2 and the accompanying description.

In Block 315, service provider data is obtained regarding one or more well service providers in accordance with one or more embodiments. In some embodiments, the service provider data may be similar to the service provider data described above in FIG. 2 and the accompanying description.

In Block 320, a well intervention plan is generated using a scheduling criterion, well data, resource data, and/or service provider data in accordance with one or more embodiments. Using different types of data, a well intervention plan may be generated by a well intervention manager that accounts for various probabilities of different well events (such as weather conditions, delays, safety or government regulatory issues).

In Block 325, a well intervention plan and/or a scheduling criterion are analyzed using one or more ML algorithms in accordance with one or more embodiments. In some embodiments, a ML algorithm trains a model to build the well intervention plan based on specific input features (e.g., data inputs). For example, the well intervention manager may build multiple well intervention plans within seconds to accommodate multiple sets of data inputs for different well scenarios depending on the user defined importance of variables which are flexible to change when required (swap importance relevance of setup by incidents, cost, contract, performance, etc.). As another example, the well intervention manager displays the well intervention plan to observe appearance, conflicts and awareness as per setup. The well intervention manager makes decisions that the scheduling criterion and/or the well intervention plan need adjustment.

Furthermore, the well intervention manager assesses the statistical trend of data inputs as an additional value to enhance the automatic machine learning self-decision process of the schedule. Thus, the well intervention manager may allow flexibility to accommodate real-time changes on the fly for any observed matters (e.g., safety concerns, government, weather, legal, etc.) to improve robustness of the schedule by advising about possible issues. The well intervention manager assesses the well intervention plans for different well scenarios in order to better arrange a forward schedule based on the obtained real-time data from actual processes and real events. As such, the well intervention manger accommodates substantial amount of site planning, emerging issues, and rescheduling well intervention operations.

In Block 330, a determination is made whether to update a scheduling criterion in accordance with one or more embodiments. For example, based on changing logistics at a well site, a scheduling criterion may be updated to account for different real-time conditions. Where it is determined that the scheduling criterion does not need to be updated, this process may proceed to Block 340. Where it is determined that the scheduling criterion needs to be updated, this process may proceed to Block 335.

In Block 335, a scheduling criterion is updated based on a data input adjustment in accordance with one or more embodiments. In some embodiments, the data input adjustment is based on detecting a condition or event that affects the accuracy or likelihood of implementing a previous well intervention plan.

In Block 340, a well intervention plan and/or a scheduling criterion are presented within a graphical user interface in accordance with one or more embodiments. For example, a well intervention manager may provide a current or new well intervention plan for a user. Next to the well intervention plan, the scheduling criterion with the corresponding inputs may be shown to illustrate the basis for the well intervention plan.

In Block 345, a determination is made whether the well intervention plan is valid in accordance with one or more embodiments. In some embodiments, a well intervention plan is validated to be final when no conflicts are observed by both the user and the well intervention manager. In some embodiments a well intervention plan needs to be adjusted by the well intervention manager based on an updated scheduling criterion and data inputs when conflicts are observed in the current well intervention plan. Where the well intervention plan is invalid, this process may proceed to Block 305. Where the well intervention plan is valid, this process may proceed to Block 350.

In Block 350, one or more commands are transmitted to adjust well operations based on a well adjustment plan in accordance with one or more embodiments. For example, a well intervention manager may communicate with one or more control systems at a well site in order to implement various sub-tasks in a well intervention plan according to a desired time line.

In some embodiments, a well intervention manager performs the process described in FIG. 3 above using data inputs based on contracts, service providers, materials, a scope of work for a well intervention operation, a cost of the well intervention operation, and various restrictions (such as alternate restrictions for different well scenarios). For example, the well intervention manager may independently access each data input in the context of a scheduling criterion (e.g., assign the data input no weight or significant weight). The well intervention manager may process well data, resource data, and/or service provider data in order to discard various cases that cannot satisfy a particular scheduling criterion. The well intervention manager may arrange the possible well intervention plan to restrict and/or arrange multiple options in a well intervention plan. Once a well intervention plan is built, a well intervention plan may provide a schedule of various tasks for implementing the well intervention plan. The well intervention plan may be displayed with various conflicts and awareness being highlighted. The well intervention manager may decide if an adjustment is needed based on newly acquired data or a new analysis of existing data. Likewise, the well intervention manager may send a request to a user device for feedback regarding the existing well intervention plan. Once a final well intervention plan with a final schedule is drafted, the plan may proceed to final approval. At final approval, a well intervention manager may validate the plan based on whether existing conflict checks are observed. In some embodiments, the well intervention play may be approved and/or revised by users.

Figure 4:
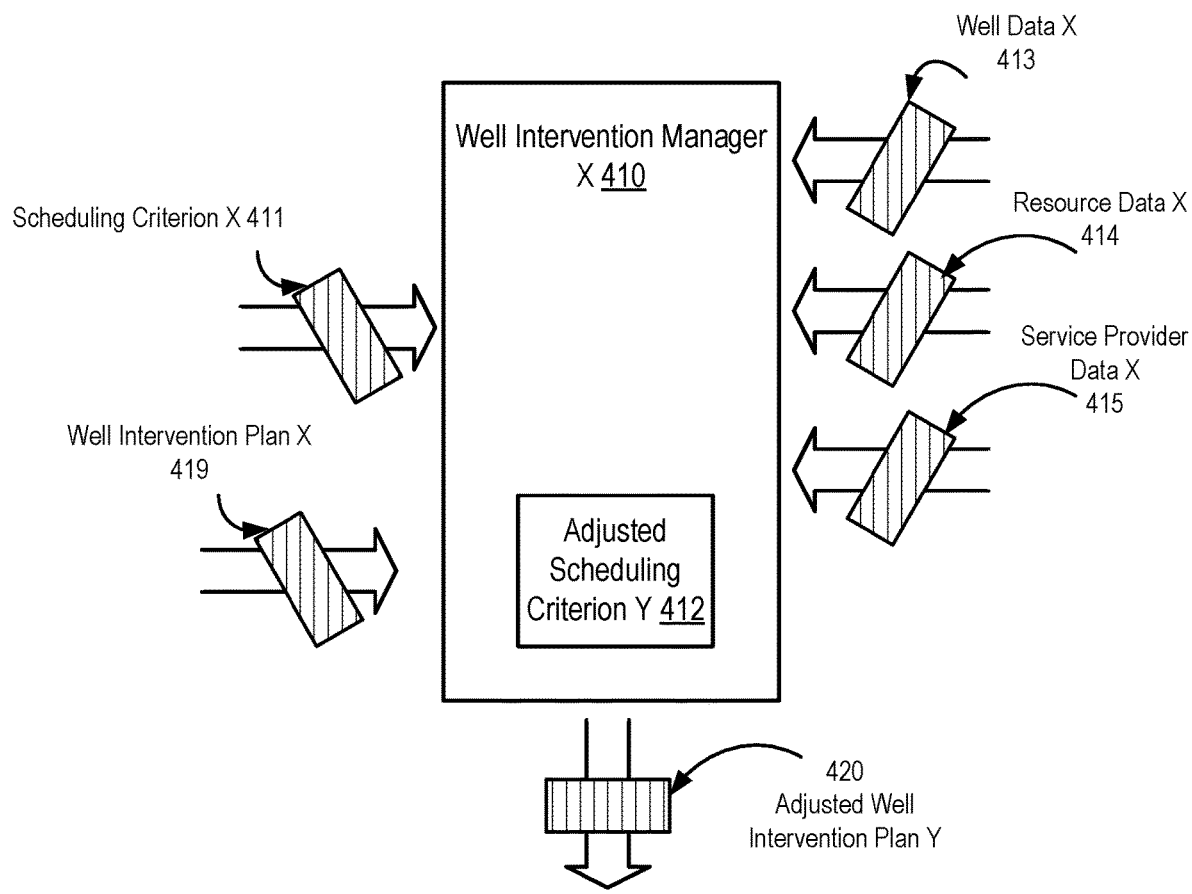
FIG. 4 shows an example in accordance with one or more embodiments.

Turning to FIG. 4, FIG. 4 provides an example of a ML model in accordance with one or more embodiments. The following example is for explanatory purposes only and not intended to limit the scope of the disclosed technology. In FIG. 4, FIG. 4 illustrates a well intervention manager X (410) that obtains well data X (413), resource data X (414), service provider data X (415) and a scheduling criterion X (411). Using a machine learning algorithm, the well intervention manager X (410) adjusts the underlying data inputs for the scheduling criterion X (411) to generate an adjusted scheduling criterion Y (412). Accordingly, the original well intervention plan X (419) is revised to generate an adjusted well intervention plan Y (420) using the adjusted scheduling criterion Y (412). Likewise, the adjusted well intervention plan Y (420) is used to modify well operations at well X (480).

Turning to FIGS. 5A, 5B, 5C, 5D, and 5E, FIGS. 5A, 5B, 5C, 5D, and 5E provide examples of a well intervention manager modifying data inputs for a well intervention plan. The following examples are for explanatory purposes only and not intended to limit the scope of the disclosed technology.

Figure 5A:
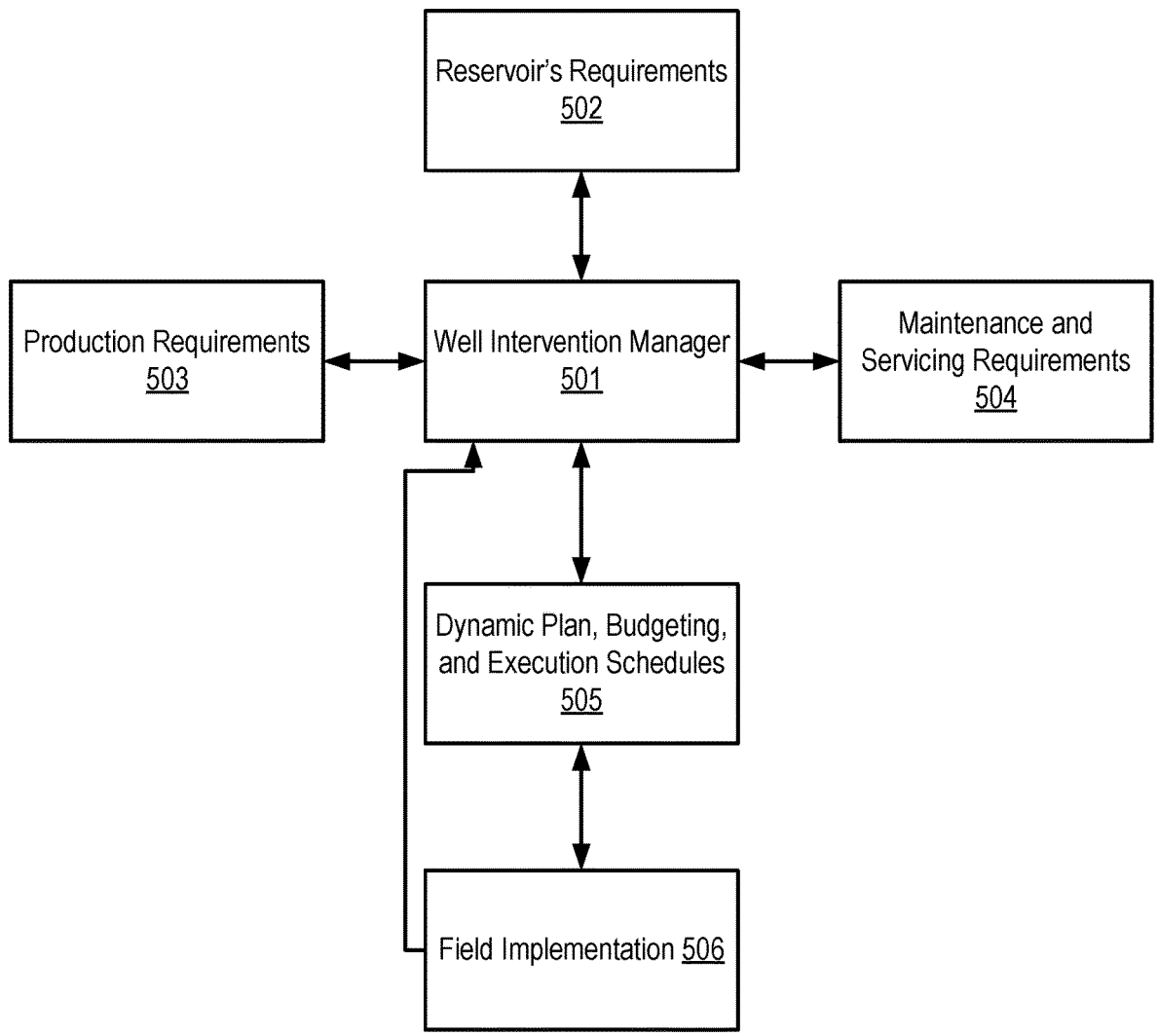
FIGS. 5A, 5B, 5C, 5D, and 5E show examples in accordance with one or more embodiments.
Figure 5B:
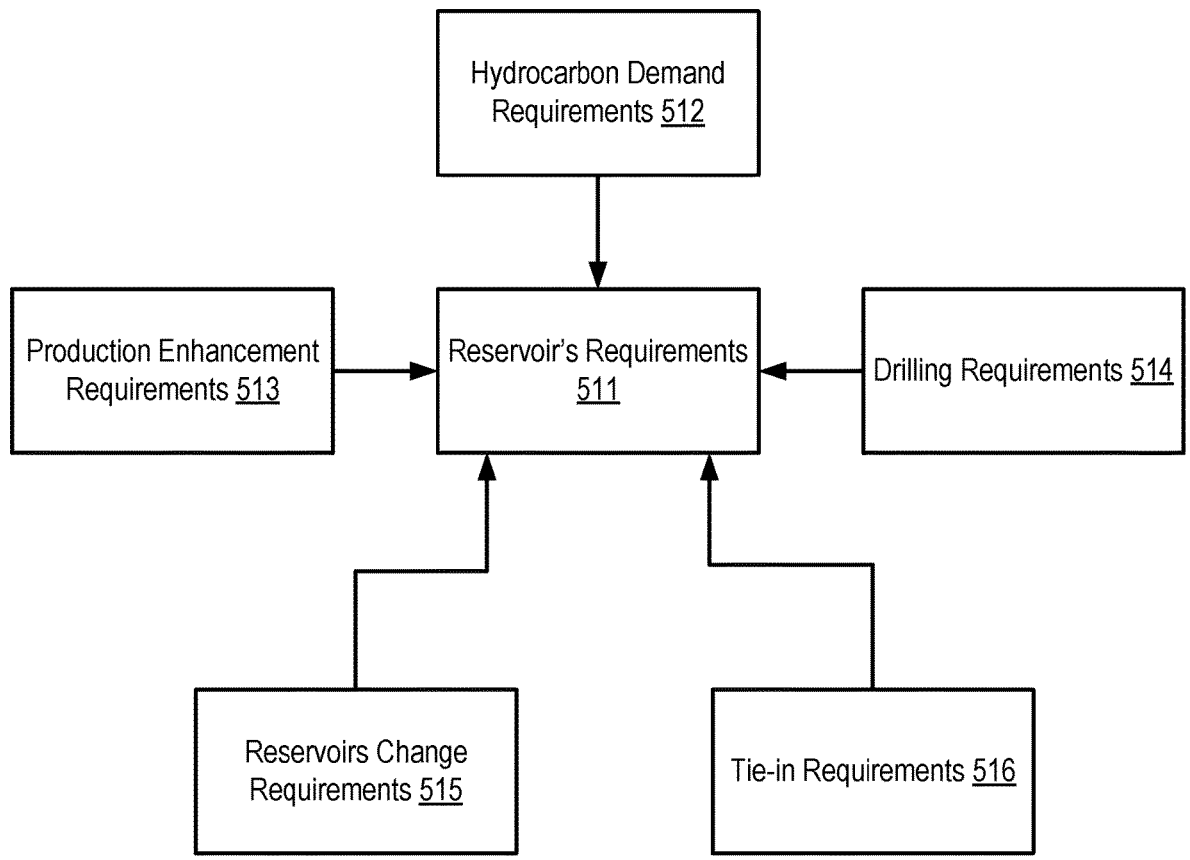
Figure 5C:
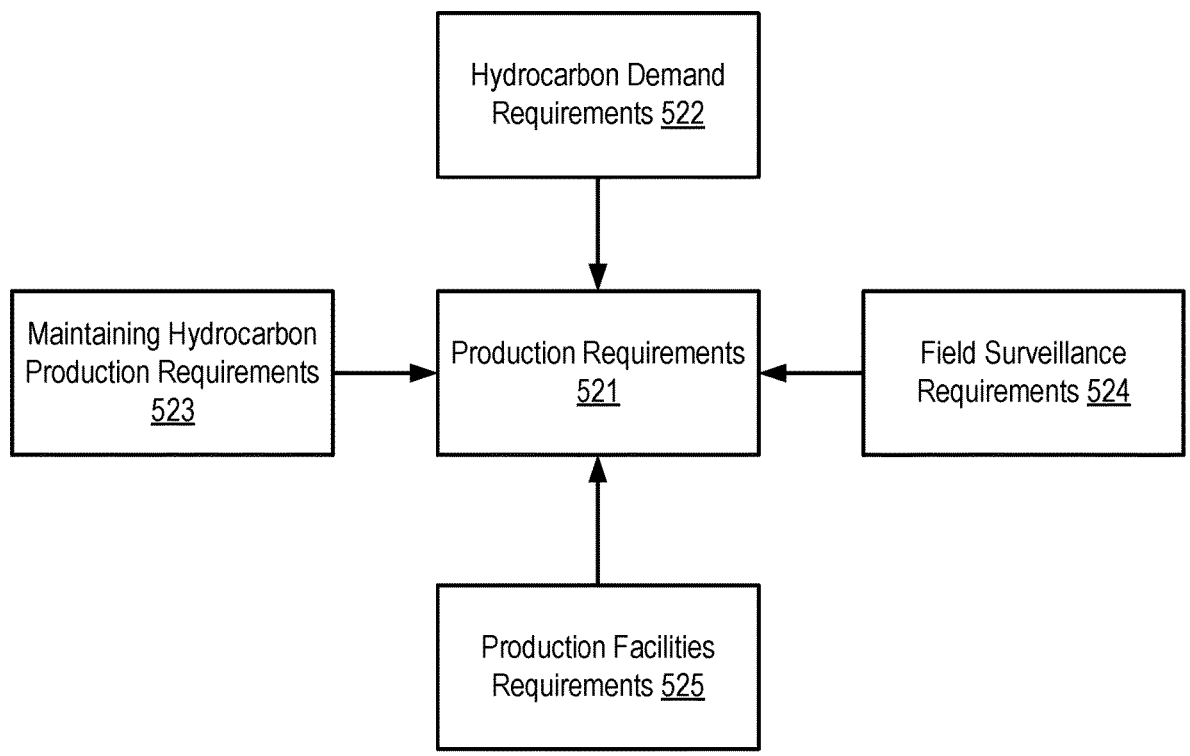
Figure 5D:
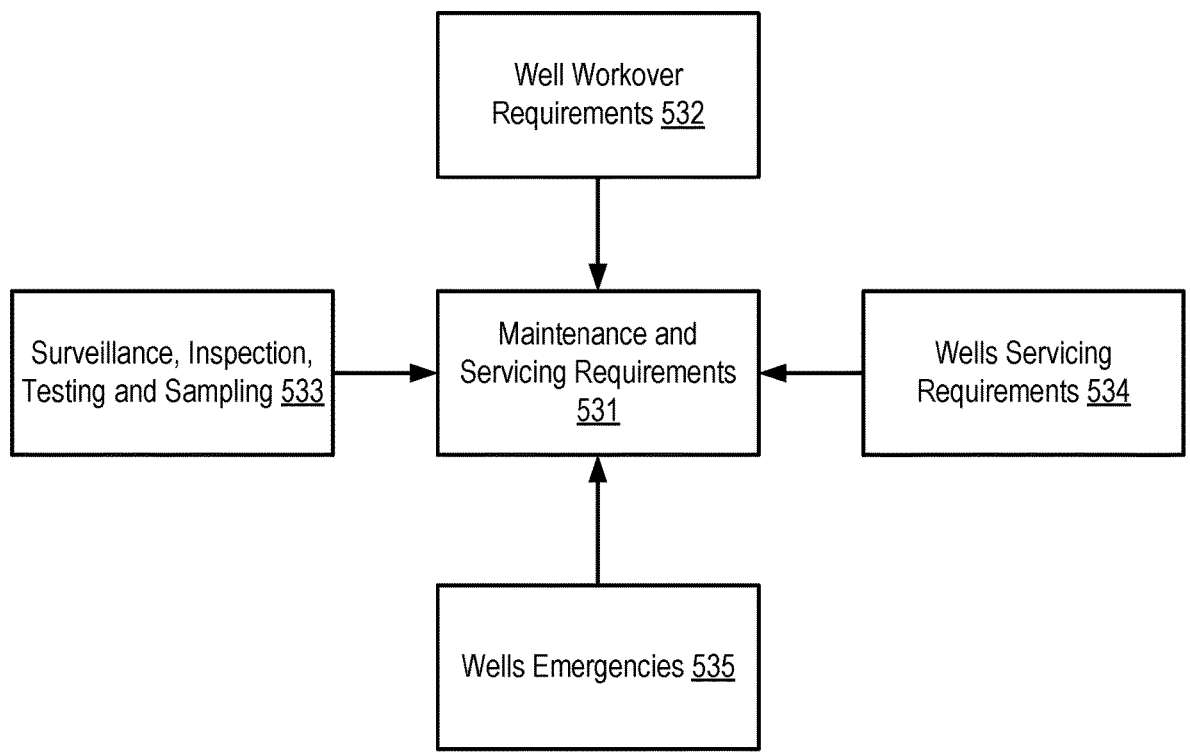
Figure 5E:
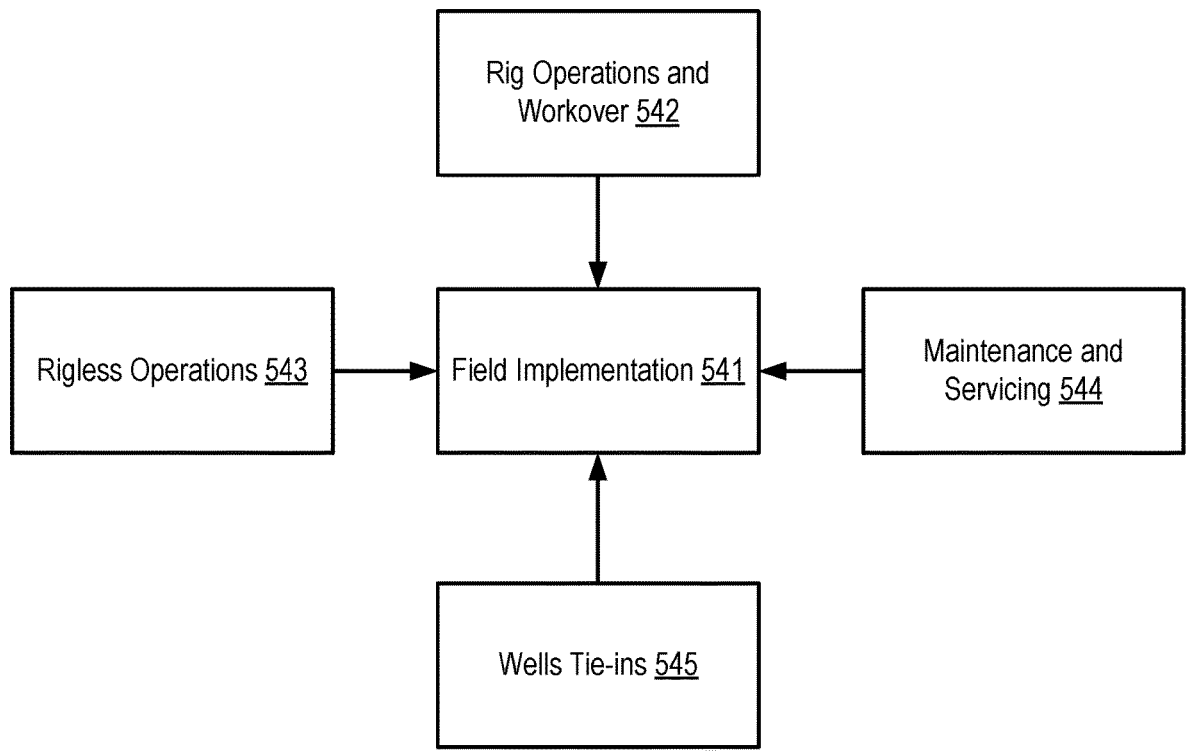

Turning to FIG. 5A, a well intervention manager (501) collects data regarding reservoir's requirements (502), production requirements (503), maintenance and servicing requirements (504), dynamic plan, budgeting, and execution schedules (505), and field implementation (506). Based on this data, the well intervention manager (501) may revise the data inputs for determined a well intervention plan. Turning to FIG. 5B, a reservoir's requirements (511) are determined using data inputs and revised data inputs from production enhancement requirements (513), drilling requirements (514), hydrocarbon demand requirements (512), reservoir change requirements (515), and tie-in requirements (516). In FIG. 5C, production requirements (521) are determined by hydrocarbon demand requirements (522), maintaining hydrocarbon production requirements (523), field surveillance requirements (524), and production facilities requirements (525). In FIG. 5D, maintenance and servicing requirements (531) are determined using data inputs from well workover requirements (532), surveillance, inspection, testing, and sampling (533), well servicing requirements (534), and data regarding well emergencies (535). In FIG. 5E, a field implementation (541) is determined using data regarding rig operations and workover (542), rigless operations (543), maintenance and servicing (544), and wells tie-ins (545).

In some embodiments, oilfield activity planning is a very demanding task and requires inputs from various sources. Some input sources may include reservoir requirements, hydrocarbon production requirements, maintenance and servicing requirements, and field implementation outputs (see, e.g., FIG. 5A). These input sources may depend on secondary inputs that are dynamic in nature. For example, various reservoir requirements may depend on several data inputs such as hydrocarbon demand, drilling requirements, production enhancement requirements, reservoir changes, and tie-in requirements (see, e.g., FIG. 5B). As such, reservoir requirements may be used to forecast a required hydrocarbon production based on global demands (e.g., for planning the number of new wells needed to be drilled to meet the required hydrocarbon production). Likewise, reservoir requirements may change the reservoir targets on existing wells to meet new or different production targets. In addition, reservoir requirements may forecast tie-in plans to connect certain wells to hydrocarbon production facilities. Similarly, production requirements (see, e.g., FIG. 5C) may depend on hydrocarbon demand in terms of particular types and qualities, such as crude oil grade, sweet or sour natural gas, etc. Other data inputs may arise from the need to maintain hydrocarbon production capacity from one or more existing wells. Example of such data inputs may include stimulation or performing scale removal to restore well productivity at one or more wells. In addition, some scheduling requirements may arise from the status of the hydrocarbon processing facilities. For example, some well activities and well tasks may be unable to be performed if the hydrocarbon processing facility is not operational (e.g., a processing plant is shut down for maintenance and inspection, or an emergency situation occurs). In contrast, other tasks may be performed while the processing facility is shut down. A well intervention manager may use these different data sources to adjust one or more well intervention plans. Moreover, production requirement inputs may be based on monitoring and acquiring well data, field data, and reservoir data through various surveillance activities such as well corrosion monitoring and acquiring static bottom hole pressure, etc.

With regard to the maintenance and servicing requirements (see, e.g., FIG. 5D), several inputs may be used, such as performing maintenance on the well through rig workover. Thus, workover operations may be performed to replace corroded tubings, or repairing tubing annulus communication for example. Other data inputs may include surveillance, inspection, testing and sampling such as annuli survey, landing base inspection, wellhead valve integrity tests, and surface sampling of reservoir fluids such as water sampling. In addition, wells servicing may be required such as wellhead valves cycling and greasing and wellhead repairs. Also, in emergency situations, wells may need to be attended to control the emergency situation (e.g., by shutting the well or installing an isolation plugs). In case of an emergency, a well Intervention manager may identify all the affected wells faster in order to be shut-in and control the emergency situation.

Based on the acquired data inputs, well intervention manager may generate one or more plans and task schedules. In some embodiments, a well intervention manager estimates required budgets as well as time and resources to perform various tasks in addition to estimating hydrocarbon gains. Thus, a well intervention manager may also provide feedback and/or recommendations or suggested changes to the different input sources to meet various constraints such as available resources and allocated budgets. Once well intervention plan is approved and executed, the well intervention manager may collect the input information from the different sources (see, e.g., FIG. 5E) such as rig and workover operations details, rigless operations details, maintenance and servicing details, tie-in details, surveillance outputs, and sampling output. Those data sources may generate information such as the rig and rigless site reports, stimulation job reports, maintenance reports, and logging output. Data input sources may also form the feedline to provide the data needed for a machine learning process, where a system may utilize machine-learning algorithms to read and compare acquired data with a particular plan. Thus, a system may identify changes that occurred during an implementation phase (e.g., problems and contingencies that arose, changes in field and reservoirs' conditions, etc.). Some processes may be thus repeated in a different plan, while incorporating knowledge gains from previous cycles.

Figure 6:
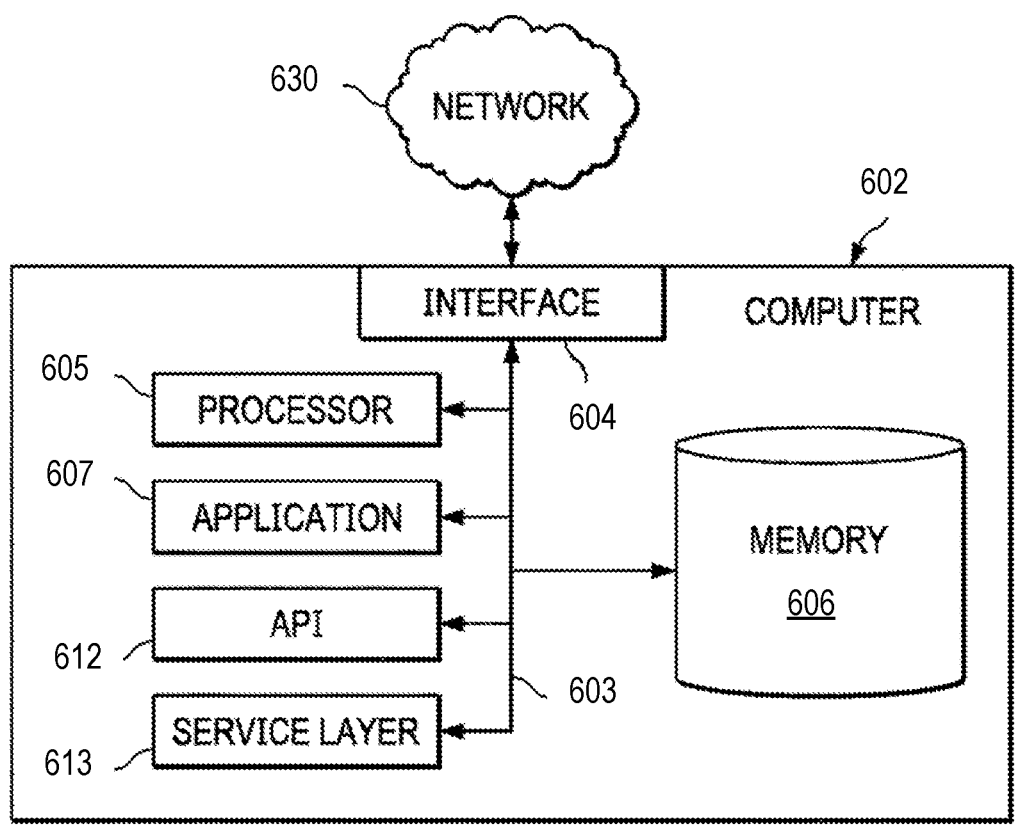
FIG. 6 shows a computer system in accordance with one or more embodiments.

Embodiments may be implemented on a computer system. FIG. 6 is a block diagram of a computer system (602) used to provide computational functionalities associated with described algorithms, methods, functions, processes, flows, and procedures as described in the instant disclosure, according to an implementation. The illustrated computer (602) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include a computer that includes an input device, such as a keypad, keyboard, touch screen, or other device that can accept user information, and an output device that conveys information associated with the operation of the computer (602), including digital data, visual, or audio information (or a combination of information), or a GUI.

The computer (602) can serve in a role as a client, network component, a server, a database or other persistency, or any other component (or a combination of roles) of a computer system for performing the subject matter described in the instant disclosure. The illustrated computer (602) is communicably coupled with a network (630). In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) from a client application (for example, executing on another computer (602)) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602). The functionality of the computer (602) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or other suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or sub-modules of another software module, enterprise application, or hardware module without departing from the scope of this disclosure.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604 includes logic encoded in software or hardware (or a combination of software and hardware) and operable to communicate with the network (630). More specifically, the interface (604) may include software supporting one or more communication protocols associated with communications such that the network (630) or interface's hardware is operable to communicate physical signals within and outside of the illustrated computer (602).

The computer (602) includes at least one computer processor (605). Although illustrated as a single computer processor (605) in FIG. 6, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a memory (606) that holds data for the computer (602) or other components (or a combination of both) that can be connected to the network (630). For example, memory (606) can be a database storing data consistent with this disclosure. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602).

There may be any number of computers (602) associated with, or external to, a computer system containing computer (602), each computer (602) communicating over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602).

In some embodiments, the computer (602) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method, comprising:
performing a plurality of historical well intervention events at a plurality of production wells using one or more well intervention providers and based on one or more well conditions,
wherein the plurality of historical well intervention events comprise one or more hydraulic stimulation operations, one or more flow back operations, one or more wellhead maintenance operations, one or more slickline operations, and one or more coiled tubing operations;
obtaining, by a well intervention manager and from the plurality of production wells over a well management network, training data comprising training well data and a plurality of scheduling criteria, wherein the training well data and the plurality of scheduling criteria correspond to the plurality of historical well intervention events;

training, by the well intervention manager, an artificial neural network based on the training data and a machine learning algorithm to produce a trained model;

generating, automatically by the well intervention manager and based on a predetermined scheduling criterion, a first well intervention plan for a well site, wherein the first well intervention plan is generated using a first plurality of data inputs regarding one or more well intervention providers and one or more well conditions, and wherein the well site comprises a wellbore, a production tree, and a wellhead assembly;

obtaining, by the well intervention manager, first real-time well data regarding the well site and second real-time well data from the plurality of production wells;

obtaining, by the well intervention manager and from a server, service provider data regarding a plurality of service entities, wherein the service provider data describes one or more contract timing expirations and one or more service provider availabilities for a respective service entity among the plurality of service entities;

updating, automatically by the well intervention manager in real-time, the trained model using the first real-time well data and the second real-time well data, wherein the well intervention manager continues to train the trained model during performance of one or more well operations performed during the first well intervention plan;

adjusting, automatically by the well intervention manager and using the first real-time well data and the service provider data, the predetermined scheduling criterion to produce an adjusted scheduling criterion, wherein the adjusted scheduling criterion corresponds to a second plurality of data inputs that are different from the first plurality of data inputs;

generating, automatically by the well intervention manager, a predicted well intervention plan for the well site using the trained model and based on the first well intervention plan, wherein the adjusted scheduling criterion, the first real-time well data, and the service provider data are inputs to the trained model to output the predicted well intervention plan;

transmitting, by the well intervention manager, a first command to a first control system comprising a programmable logic controller (PLC) at the well site; and adjusting, by the first control system, a first well operation based on the predicted well intervention plan in response to receiving the first command from the well intervention manager, wherein the first well operation comprises a hydraulic stimulation of a reservoir region connected to the wellbore at the well site, and wherein the hydraulic stimulation of the reservoir region increases hydrocarbon recovery at the well site.

2. The method of claim 1, further comprising:
generating, by the well intervention manager, a plurality of well scenarios that correspond to a plurality of different scheduling criteria;

selecting, automatically by the well intervention manager and based on well data, a well scenario among the plurality of well scenarios in response to detecting at least one scheduling criteria among the plurality of different scheduling criteria is satisfied; and adjusting, by the well intervention manager, the predicted well intervention plan based on the well scenario.

3. The method of claim 1, further comprising:
presenting, by a user device using a graphical user interface, the predicted well intervention plan among a plurality of well intervention plans; and obtaining, in response to a user input within the graphical user interface, a user selection of the predicted well intervention plan among the plurality of well intervention plans, wherein the first command is transmitted in response to the user selection.

4. The method of claim 1, further comprising:
obtaining, from an inventory server, resource data regarding a plurality of drilling tools, wherein the resource data describes a respective location of a respective tool among the plurality of drilling tools and a respective time period that the respective tool is available for use at the well site, and wherein the well intervention manager generates the predicted well intervention plan using the resource data.

5. The method of claim 1,
wherein the service provider data further comprises budget data and interaction data between different departments of the respective service entity.

6. The method of claim 1,
wherein the first real-time well data comprises weather condition data, safety alert data, and well progress data regarding the well site.

7. The method of claim 1, further comprising:
transmitting, by the well intervention manager, a second command to a second control system;

adjusting, by the second control system, a second well operation based on the predicted well intervention plan in response to receiving the second command from the well intervention manager, and wherein the second well operation is selected from a group consisting of: a slickline operation, a wireline operation, a well maintenance operation, a snubbing operation, workover, and a coiled tubing operation.

8. A system, comprising:
a plurality of servers;

a well site comprising a wellbore, a production tree, a wellhead assembly, and a first control system, wherein the first control system comprises a programmable logic controller (PLC); and a well intervention manager coupled to the plurality of servers and the first control system at the well site, the well intervention manager comprising a computer processor, wherein the well intervention manager is configured to perform a method comprising:

performing a plurality of historical well intervention events at a plurality of production wells using one or more well intervention providers and based on one or more well conditions, wherein the plurality of historical well intervention events comprise one or more hydraulic stimulation operations, one or more flow back operations, one or more wellhead maintenance operations, one or more slickline operations, and one or more coiled tubing operations;

obtaining, by a well intervention manager and from the plurality of production wells over a well management network, training data comprising training well data and a plurality of scheduling criteria, wherein the training well data and the plurality of scheduling criteria correspond to the plurality of historical well intervention events;

training, by the well intervention manager, an artificial neural network based on the training data and a machine learning algorithm to produce a trained model;

generating, automatically based on a predetermined scheduling criterion, a first well intervention plan for the well site, wherein the first well intervention plan is generated using a first plurality of data inputs regarding one or more well intervention providers and one or more well conditions;

obtaining first real-time well data regarding the well site and second real-time well data from the plurality of production wells;

obtaining, from a first server among the plurality of servers, service provider data regarding a plurality of service entities, wherein the service provider data describes one or more contract timing expirations and one or more service provider availabilities for a respective service entity among the plurality of service entities updating, automatically by the well intervention manager in real-time, the trained model using the first real-time well data and the second real-time well data, wherein the well intervention manager continues to train the trained model during performance of one or more well operations performed during the first well intervention plan;

adjusting, automatically using the first real-time well data and the service provider data, the predetermined scheduling criterion to produce an adjusted scheduling criterion, wherein the adjusted scheduling criterion corresponds to a second plurality of data inputs that are different from the first plurality of data inputs;

generating, automatically, a predicted well intervention plan for the well site using the trained model and based on the first well intervention plan, wherein the adjusted scheduling criterion, the first real-time well data, and the service provider data are inputs to the trained model to output the predicted well intervention plan; and transmitting a first command to the first control system at the well site, and wherein the first control system is configured to adjust a first well operation based on the predicted well intervention plan in response to receiving the first command from the well intervention manager, and wherein the first well operation comprises a hydraulic stimulation of a reservoir region connected to the wellbore at the well site, and wherein the hydraulic stimulation of the reservoir region increases hydrocarbon recovery at the well site.

9. The system of claim 8, wherein the well intervention manager further comprises functionality for:

generating a plurality of well scenarios that correspond to a plurality of different scheduling criteria;

selecting, automatically based on well data, a well scenario among the plurality of well scenarios in response to detecting at least one scheduling criteria among the plurality of different scheduling criteria is satisfied; and adjusting the predicted well intervention plan based on the well scenario.

10. The system of claim 8, further comprising:

a user device coupled to the well intervention manager, wherein the user device presents, using a graphical user interface, the predicted well intervention plan among a plurality of well intervention plans, wherein the user device obtains, in response to a user input within the graphical user interface, a user selection of the predicted well intervention plan among the plurality of well intervention plans, and wherein the first command is transmitted in response to the user selection.

11. The system of claim 8, wherein the plurality of servers comprises an inventory server, wherein the well intervention manager further comprises functionality for:

obtaining, from the inventory server, resource data regarding a plurality of drilling tools, wherein the resource data describes a respective location of a respective tool among the plurality of drilling tools and a respective time period that the respective tool is available for use at the well site, and wherein the well intervention manager generates the predicted well intervention plan using the resource data.

12. The system of claim 8, wherein the service provider data comprises budget data and interaction data between different departments of the respective service entity.

13. The system of claim 8, wherein the first real-time well data comprises weather condition data, safety alert data, and well progress data regarding the well site.

14. The system of claim 8, further comprising:

a second control system, wherein the second control system is configured to adjust a second well operation based on the predicted well intervention plan in response to receiving a second command from the well intervention manager, and wherein the second well operation is selected from a group consisting of: a slickline operation, a wireline operation, a well maintenance operation, a snubbing operation, workover, and a coiled tubing operation.

* * * * *